April 10, 1956 W. A. ANDREWS ET AL 2,741,088
FLOW CONTROL MEANS FOR INTERNAL-COMBUSTION ENGINE FUEL SYSTEMS
Filed Sept. 13, 1951 2 Sheets-Sheet 1
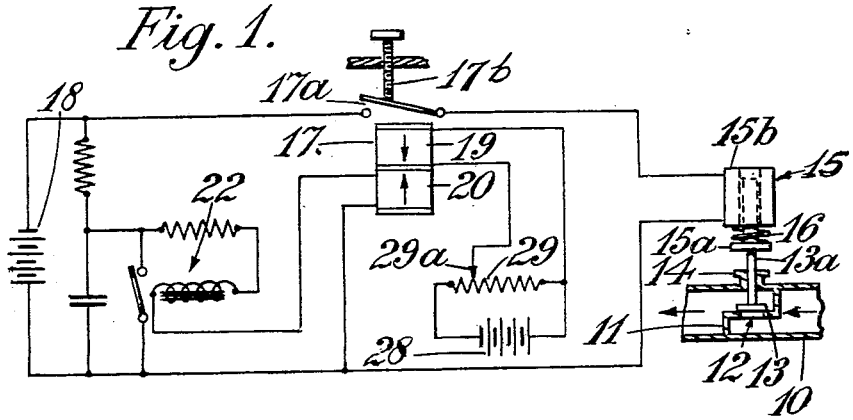
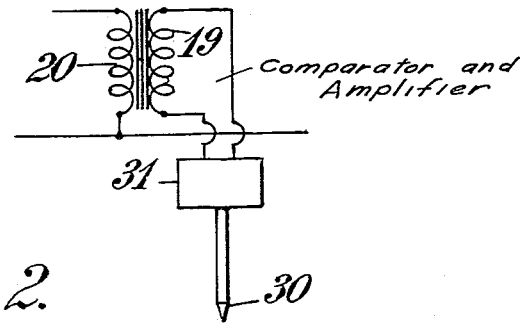
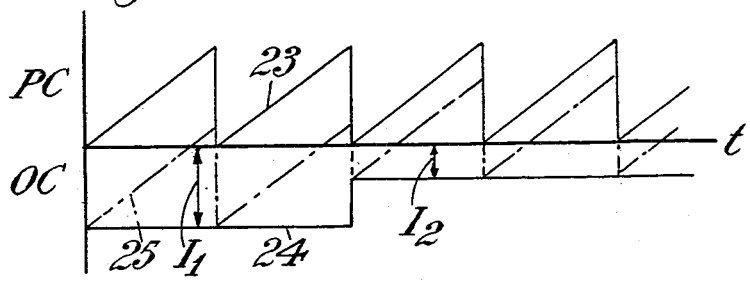
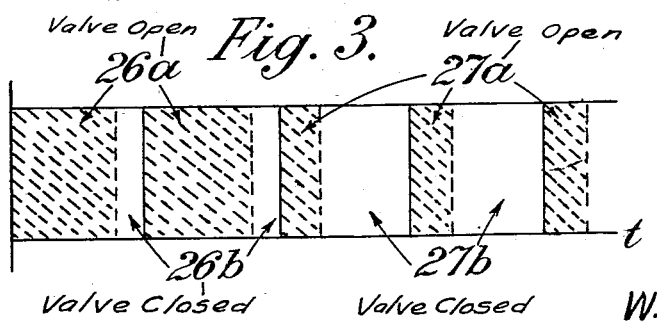
INVENTORS.
W. A. ANDREWS &
A. J. SMITH
By Wilkinson & Mawhinney
ATTYS.

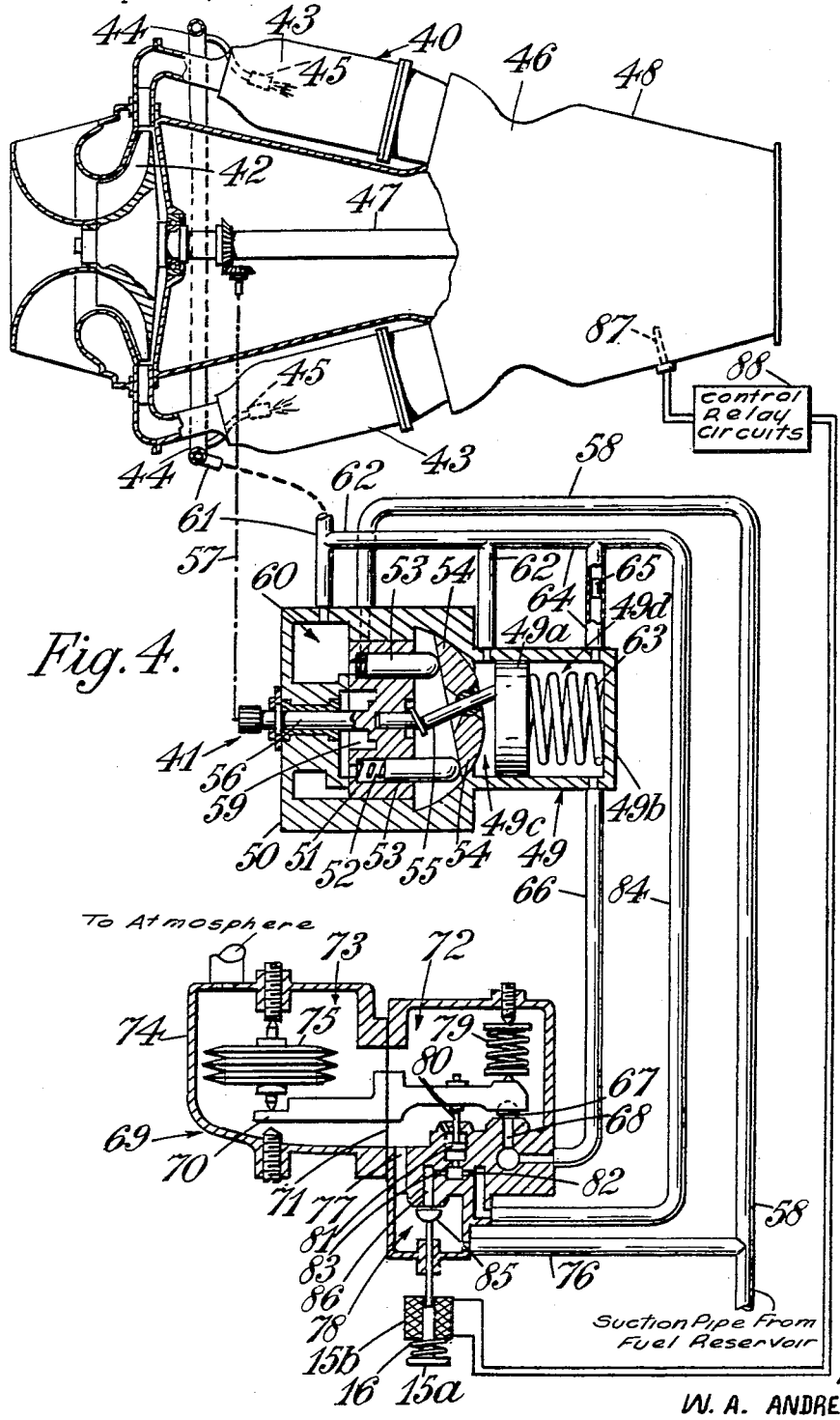

United States Patent Office 2,741,088
Patented Apr. 10, 1956

2,741,088

FLOW CONTROL MEANS FOR INTERNAL-COMBUSTION ENGINE FUEL SYSTEMS

Walter Agnew Andrews, Alvaston, Derby, England, and Alfred John Smith, Glasgow, Scotland, assignors to Rolls-Royce Limited, Derby, England, a British company Application September 13, 1951, Serial No. 246,435

Claims priority, application Great Britain September 29, 1950

12 Claims. (Cl. 60—39.28)

This invention relates to fluid flow systems in which it is desired to control the flow of a fluid through a pipe or the like, and the invention has important, though not exclusive, application in servo-fluid flow control systems of liquid fuel supply systems of gas-turbine engines.

It is usual, when such a control is required, to provide a valve which effects the desired control by being opened-up or closed-off to an extent which is dependent on the departure of the instantaneous value of the variable from the preselected value thereof. It has been found that, in some servo-fluid flow systems, such a valve control arrangement may be adversely affected in operation by the presence of small particles of solid matter in the servo-fluid since the extent of opening or closing of the valve is critical, particularly at small openings.

The present invention has for an object to provide a servo-fluid flow control arrangement for a fuel supply system of a gas-turbine engine, in which control arrangement a valve is used to control the flow of servo-fluid which is not subject to the disadvantage above mentioned.

According to the present invention, a servo-fluid flow control system for the fuel system of a gas-turbine engine comprises a valve arranged to control the flow of servo-fluid in a pipe or the like, automatic actuator means to effect rapid and alternate opening and closing of said valve, and means to vary the ratio of the period of time for which the valve is open to the period of time for which the valve is closed.

Preferably, the means to vary the ratio of the period of time for which the valve is open to the period of time for which it is closed comprises means sensitive to the extent of departure of the instantaneous value of a variable from a preselected value thereof, and connected to regulate said ratio to be a function of the extent of said departure.

Such a servo-fluid flow control system has an important application in controlling the flow of liquid fuel through a fuel supply system to combustion equipment of gas-turbine engines. In such an application, the servo-fluid flow control system may be operated in accordance with a variable which may be selectable manually or automatically, or may be an engine operating variable for instance the engine exhaust gas or turbine temperature, or ambient pressure, or compressor delivery pressure, or engine rotational speed.

The automatic actuator means is most conveniently electrical in operation, and in one preferred form comprises an electro-magnetic device, for instance a solenoid device, to effect opening and closing of the valve, and means rapidly and alternately to energise and de-energise the electro-magnetic device comprising a relay switch device controlling the energisation of the electro-magnetic device, which relay switch device is arranged to be polarised by a pulsating current, such as a saw tooth current, of selected periodicity and constant maximum amplitude and to be supplied with an operating current producing a magnetic effect of opposite polarity which operating current is a direct current and has at any instant a value proportional to the extent of departure of the instantaneous value of the variable from the given value of the variable; the relay switch device may conveniently comprise two windings, one of which carries the pulsating current and the other of which carries the operating current. The electrical control mechanism may be arranged to be actuated by a temperature-sensitive device located in, say, the exhaust pipe or turbine of the engine so that the operating current is a function of the amount by which the temperature exceeds a preselected temperature.

In liquid fuel supply systems of internal combustion engines employing the invention, the valve is arranged to control the operation of a fluid-operated servo system which is arranged in turn to control the fuel supply.

In one well-known fuel system, fuel pressure controlling means includes a barometric device which is responsive to atmospheric pressure and is arranged to maintain for each value of the barometric pressure a corresponding value of the fuel delivery pressure to the engine, and in such fuel system, it may be desirable to provide override means to be actuated in accordance with exhaust temperature in a manner to prevent preselected temperature being exceeded in the turbine or exhaust pipe of the engine. The invention may be employed to afford such override means by arranging that the barometric pressure control is loaded by a fluid pressure existing between a pair of restrictors in a bleed line leading from the point in the fuel system at which the pressure is to be controlled, to an outflow which is valve-controlled by a valve arrangement of this invention, and by arranging that during normal operation of the barometric control the valve is effectively open and that, when it is desired to override the barometric control, the valve is, by alternate opening and closing and by varying the ratio of time open to time closed, effectively closed to a greater or lesser extent thereby increasing the pressure intermediate the two restrictors and thus reducing the controlled pressure.

Some embodiments of this invention will now be described with reference to the accompanying drawings in which Figure 1 illustrates the invention applied to controlling flow in a pipe, Figure 1A illustrates one way in which the arrangement of Figure 1 may be modified, Figures 2 and 3 are diagrams illustrating the effect of the arrangement of the invention as shown in Figure 1, and Figure 4 is a diagrammatic illustration of one practical way in which the fluid flow control of Figures 1–3 may be employed to control the fuel supply of a gas-turbine engine.

Referring to Figure 1, there is shown a pipe 10 through which flows a fluid, and it is desired to control the flow of fluid in accordance with a control variable, which may be a manual-selectable control variable, a temperature, a pressure or any other factor for which it is desired to make a control.

In the pipe there is provided a partition 11 having a port 12 therein and the flow through the port 12 is controlled by a lift valve 13. The valve is moved rapidly and alternately between a first position in which it closes off the port 12 and a second position in which it substantially effects no restriction of the port, and the ratio of the time for which it is closed to the time for which it is open is varied in accordance with the instantaneous value of the control variable. It is found that in this way the rate of flow is controlled to be a function of the control variable and any difficulty due to foreign matter blocking the valve during small flows is avoided.

One convenient electrical control mechanism for opening and closing the valve 13 and for varying the ratio of "time open" to "time closed," is shown.

The valve 13 has a stem 13a projecting from the pipe 10 through a convenient gland 14, and the stem is connected to the armature 15a of an electromagnetic device 15 such as a solenoid. The armature 15a is loaded by a spring 16 to close valve 13 on port 12 and on energisation of the device 15 by passage of an electric current through its coil 15b, the armature 15a is drawn to compress the spring 16 and fully to open valve 13.

The coil 15b is fed with energising current from a battery 18 under control of contacts 17a forming part of a relay 17 having twin operating coils 19, 20. An adjustable stop 17b is provided to limit the extent of opening of the contacts 17a. The coil 20 is a polarising coil for the relay 17 and is fed from the battery through pulsator 22 with a pulsating "saw-tooth" type current (PC) of constant maximum amplitude and a periodicity of say about 20 cycles per second to produce a magnetic effect of a polarity tending to keep contacts 17a open. Such a current is indicated by trace 23 of Figure 2. The operating coil 19 is fed with direct current (referred to hereinafter as the "operating current") the value of which is controlled in accordance with the instantaneous value of the control variable, and this operating current is indicated by trace 24 of Figure 2 and produces an opposite magnetic effect to coil 20. The effect of varying the operating current (OC) is indicated by trace 25 (Figure 2) which can represent the combined magnetic effect of coils 19, 20. It will be seen that when the operating current is large (say $I_1$) the contacts 17a are closed for a longer period of time (represented by the length of each portion of trace 25 below the time base $t$) than when they are open (represented by the portion of each saw-tooth of trace 25 above the time base $t$) but that when the value of current is reduced to say $I_2$, the ratio for the contacts 17a of the time open to time closed is increased. Similarly, the ratio of the time for which valve 13 is open to the time it is closed is varied (in this case decreased). This variation in the time the valve is open to the time closed is represented in Figure 3 to the same time base $t$ as Figure 2; the hatched portions 26a representing the valve open and portions 26b representing the valve closed for operating current $I_1$ and 27a, 27b representing valve open and valve closed respectively for operating current $I_2$.

The operating current (OC) is indicated in Figure 1 as being supplied from a battery 28 through potentiometer 29 whereof the moving contact 29a can clearly be adjusted manually or automatically to represent any desired operating variable.

Referring to Figure 1A, if it is desired to control the flow in pipe 10 in accordance with the extent say to which a temperature exceeds or falls below a selected value, the operating current may be supplied by connecting a temperature-sensitive device, say a thermocouple 30, to a comparator and amplifier circuit 31 the output from which is fed to coil 19 and is in the direction to close contacts 17a when the temperature exceeds (or falls below) the selected value. The valve 13 will thus only be opened when the temperature exceeds (or falls below) the selected value, and the ratio of time open to time closed will increase as the extent by which the temperature departs from the selected value, increases.

Referring now to Figure 4, one embodiment of this invention is shown as applied in a servo-control system for the fuel system of a gas-turbine engine 40 which fuel system is of the type comprising a variable-stroke fuel pump 41 of the swash plate type, the stroke of which is controlled by a piston and cylinder servo-device 49.

The engine 40 comprises a compressor 42, combustion equipment 43 receiving an air supply from the compressor and fuel from manifold 44 through injectors 45, and a turbine 46 which is operated by hot gas from the combustion equipment 43 and drives the compressor 42 through shaft 47. The engine also includes an exhaust unit 48.

The pump 41 comprises a casing 50 enclosing a rotor 51 having axial bores 52 containing spring-loaded plungers 53 and a swash plate mechanism 54 carried on the cranked portion of an axially-movable spindle 55 connected to piston 49a of the servo-device. As the spindle 55 is moved axially so the inclination of the swash plate 54 alters and the stroke of the plungers 53 is thus varied during rotation of rotor 51. The rotor 51 has a spindle 56 connected by a drive 57 to shaft 47, and as the rotor 51 rotates so fuel is drawn into the bores 52 from suction pipe 58 and inlet chamber 59 and delivered through outlet chamber 60 and delivery pipe 61.

The cylinder 49b in which the piston 49a works has one end space 49c connected by pipe 62 directly to the pump delivery pipe 61 and has its opposite end space 49d connected to the pump delivery through a pipe 64 containing a flow restrictor 65, this end space also housing a spring 63 to load piston 49a. The space 49d also has connected thereto a bleed pipe 66 the flow through which is controlled by a half-ball valve element 67 cooperating with a bleed port 68. When there is no flow through the bleed pipe 66, the fluid pressures on each side of the piston 49a are equal and the spring 63 moves the piston to the full stroke position of the pump 41. When there is a bleed through the bleed pipe 66 and port 68 past valve 67, the fluid pressure on the spring-loaded side of the piston 49a decreases (due to the restrictor 65 between the pump delivery and this side of the piston) and the piston 49a moves to reduce the stroke of the pump plungers.

The half-ball valve element 67 forms part of a control mechanism 69 known as a barometric pressure control, and the half-ball valve element 67 is carried by a lever 70 mounted on a flexible diaphragm 71 separating a pair of chambers 72, 73 in the casing 74 of the control mechanism 69. The chamber 73 is connected to be open to atmosphere and accommodates an evacuated capsule 75 loading the lever 70 in a direction tending to lift the half ball valve element 67 and the chamber 72 is connected by duct 77, chamber 78 and pipe 76 to the suction side of fuel pump 41 and receives the outflow through port 68 past the half ball valve element 67. A spring 79 is provided in the chamber 72 to load the lever 70 in a direction tending to close the half ball valve element 67 on to part 68.

The lever 70 is also arranged to be loaded in accordance with the fuel delivery pressure so that under normal running conditions, the control mechanism 69 operates to control the fuel delivery pressure of the fuel pump 41 to a certain value for each value of the atmospheric air pressure sensed by capsule 75.

In accordance with this embodiment of the invention, there is also provided an over-ride arrangement which operates by variation of the load due to the fuel delivery pressure and this load is applied to the lever 70 through a tappet member 80 operated by a piston device 81 which is arranged to be loaded, in a direction tending to lift the half-ball valve element 67, by the fluid pressure existing between a pair of restrictors 82, 83 arranged in series in a branch pipe 84 leading from the fuel delivery pipe 61 of the pump through chamber 78 and pipe 76 to the suction pipe 58 of the fuel pump 41. A half-ball valve element 85 is provided to control the flow through this branch pipe 84 and thus to control pressure between the restrictors 82, 83. When the half ball valve element 85 is fully closed on the outflow port 86, the pressure between the restrictors 82, 83 will be the same as the fuel delivery pressure of pump 41, but when the half ball valve element 85 is fully open the ratio of the pressure between the restrictors 82, 83 to the fuel delivery pressure in pipe 61 will have its minimum value. In normal operation the valve element is held open by spring 16, but when it is desired to over-ride the barometric control, the valve element 85 is alternately opened and closed for example as described below and as the ratio of the time the valve element is open to the time it is closed decreases, so the effective fluid pressure on piston device 81 and thus the control load on lever 70 increases and as a result the bleed flow through port 68 past valve element 67 increases and the fuel flow to the engine is decreased.

The half-ball valve element 85 is, in the arrangement shown, electromagnetically-operated so that when a temperature in the engine 40, say the temperature sensed by a thermocouple 87 in the exhaust unit, exceeds a predetermined value, the half-ball valve element 85 is alternately fully closed and fully opened at say about 20 cycles per second to increase the effect of the fuel delivery pressure on the lever 70 of the barometric pressure control 69 and thereby to cut down the fuel delivery pressure and the delivery of fuel to the gas-turbine engine combustion equipment 43, and in order to ensure that the extent to which the fuel delivery is cut down is dependent upon the amount by which the temperature sensed by device 87 exceeds the selected value, the ratio of the time for which the valve element 85 is closed to the time for which it is open is made a function of the amount by which the sensed temperature exceeds the selected temperature.

It is found that although a pulsating pressure load is applied from piston 81 through tappet 80 to the lever 70 of the barometric pressure control 69, the barometric pressure control 69 in effect responds to the mean load, which depends on the ratio of the time for which the valve element 85 is open to the time for which it is closed, and thus on the amount by which the temperature in the engine as sensed by device 87 exceeds the selected temperature.

As stated above, the half ball valve element 85 controlling the flow from the branch pipe 84 through restrictors 82, 83 is electromagnetically-controlled and in order to operate the valve element, it may be connected to the armature of a solenoid device 15 in a manner similar to that shown for valve 13 in Figure 1. The control relay circuit for solenoid 15 and its current supply circuits as a whole are indicated in Figure 4 at 88. As in the case of Figure 1, the polarising coil 20 is fed with a pulsating saw-tooth current of constant maximum amplitude and a periodicity of say about 20 cycles per second to produce a magnetic effect of one polarity tending to open the relay contacts 17a, and the operating coil 19 is fed with direct current the amplitude of which is proportional to the amount by which the temperature sensed by device 87 (much like the thermocouple 30 of Figure 1A) exceeds the selected value and is arranged to produce a magnetic effect of opposite polarity to that produced by the saw-tooth current and so to tend to close the relay contacts 17a.

Referring to Figure 4 and taking the control relay circuits 88 to be an arrangement much like Figure 1 with the thermocouple 87 connected thereto in the manner shown for the part 30 of Figure 1A, when the engine temperature is below the selected value the relay contacts 17a will be maintained open so that the solenoid-operated half ball valve element 85 will also be maintained open and the barometric pressure control 69 will operate normally. When, however, the engine temperature exceeds the selected temperature, the relay contacts 17a will be open for that part of each saw tooth impulse for which the amplitude of the saw tooth is greater than the current due to the thermocouple 87 or the like and will be closed for the remainder of the impulse, and since the current due to the thermocouple 87 will increase in accordance with the extent by which the engine temperature exceeds the selected temperature, the time for which the contacts 17a are closed will also increase as compared to the time for which they are open and the ratio of these times will be a measure of the extent to which the engine temperature exceeds the selected temperature.

We claim:

1. A fluid flow control system for the fuel system of an internal combustion engine comprising a valve arranged to control the flow of servo-fluid in a conduit; automatic actuator means to effect rapid and cyclic opening and closing of said valve; and means adapted to be operable during said rapid opening and closing of said valve to vary the ratio of the period of time for which the valve is open to the period of time for which the valve is closed and comprising means sensitive to the extent of departure of the instantaneous value of an operative variable of said engine from a preselected value thereof and connected to regulate said ratio to be a function of the extent of said departure.

2. A fluid flow control system for the fuel system of an internal combustion engine comprising a valve arranged to control the flow of servo-fluid in a conduit; automatic actuator means to effect rapid cyclic opening and closing of the valve and comprising an electro-magnetic device arranged to control opening and closing of the valve and a source of pulsating electric current of selected periodicity and selected maximum amplitude connected to said electromagnetic device to produce a first magnetic effect, and a source of direct current having at any instant a value which determines the desired control, said source of direct current being connected to said electro-magnetic device to produce a second magnetic effect which opposes said first magnetic effect; and means adapted to be operable during said opening and closing of the valve to vary the ratio of the amplitude of the pulsating current to the value of the direct current thereby to vary the ratio of the period of time for which the valve is open to the period of time for which the valve is closed.

3. A fluid flow control system for the fuel system of an internal combustion engine comprising a valve arranged to control the flow of servo-fluid in a conduit; automatic actuator means to effect rapid and cyclic opening and closing of said valve, said actuator means comprising a relay, a source of pulsating electric current of selected periodicity and selected maximum amplitude connected to said relay to produce therein a first magnetic effect, a source of direct current having at any instant a value which determines the desired control and connected to said relay to produce therein a second magnetic effect which opposes said first magnetic effect, said relay including a pair of relay contacts, an electro-magnet connected to said valve to open and close it, and a source of electric current connected to said electro-magnet to energize it, said relay contacts being connected between said source of electric current and said electro-magnet to control the supply of current thereto; and means adapted to be operable during said rapid opening and closing of said valve to vary the value of said direct current to vary the ratio of the period of time for which the valve is open to the period of time for which the valve is closed.

4. A fluid flow control system as claimed in claim 3, wherein said relay has two windings one of which is connected to carry the pulsating current and the other of which is connected to carry the direct current.

5. A fluid flow control system as claimed in claim 2, comprising a solenoid having an armature movable on energisation and de-energizsation of the solenoid, and having the valve connected for operation to the armature and the electro-magnetic device connected to control the energisation and de-energisation of the solenoid.

6. A fluid flow control system as claimed in claim 2, having said means to vary the ratio adapted to vary the value of the direct current to have an instantaneous value which is a function of the extent of departure of the instantaneous value of a variable, in accordance with which a control is to be effected, from a preselected value of said variable.

7. A fluid flow control system for the fuel system of an internal combustion engine, which fuel system includes a pressure fuel source, comprising a branch conduit arranged for connection to said pressure fuel source, a pair of flow restrictors connected in series in said branch conduit, a valve arranged to control the flow of fuel from said pressure fuel source through said branch conduit, thereby to control the fluid pressure in said branch conduit between said pair of flow restrictors, means to effect rapid cyclic opening and closing of said valve, means adapted to be operable during said rapid opening and closing of said valve to vary the ratio of the period of time for which the valve is open to the period of time for which the valve is closed, and pressure responsive means connected to respond to fluid pressure in said branch conduit between said pair of flow restrictors and arranged by its response to control a servo-fluid pressure in said fluid flow control system.

8. A fluid flow control system as claimed in claim 7, comprising also a piston, a cylinder accommodating said piston, the end spaces of said cylinder being connected to said fuel supply source, one end space being connected to said fuel supply source through a flow restriction, a spring in said one end space to load said piston, a bleed passage from said one end space, a bleed valve controlling flow through said bleed passage, said bleed valve being loaded for operation by said pressure responsive means in accordance with the fluid pressure between said two restrictors thereby to control the position of the piston in said cylinder, and means actuated by said piston to determine the fuel pressure of said fuel supply source.

9. A fluid flow control system as claimed in claim 8, wherein the bleed valve comprises a valve element carried by a rocking lever and the pressure responsive means includes a piston-operated tappet to load said lever against a lever-loading spring, the piston operating said tappet being subjected on one surface to said fluid pressure between said two restrictors.

10. A fluid flow control system as claimed in claim 9, wherein said lever is also loaded by an atmospheric-pressure responsive device.

11. A fluid flow control system for the fuel system of an internal combustion engine comprising a valve arranged to control the flow of servo-fluid in a conduit, automatic actuator means to effect rapid and cyclic opening and closing of said valve, a temperature-sensitive device arranged to be sensitive to a temperature in the engine and connected to control the valve when said temperature exceeds a selected value, and means adapted to be operable during said rapid opening and closing of said valve to vary the ratio of the period of time for which the valve is open to the period of time for which the valve is closed.

12. A fluid control system for the fuel system of an internal combustion engine comprising a valve arranged to control the flow of servo-fluid in a conduit, said valve being normally fully open, automatic actuator means to effect rapid and cyclic opening and closing of said valve, means adapted to be operable during said rapid opening and closing of said valve to vary the ratio of the period of time for which the valve is open to the period of time for which the valve is closed, and a temperature-sensitive device arranged to be sensitive to a temperature in the engine and arranged, on sensing a temperature in excess of a selected value thereof, to initiate operation of said automatic actuator means to cause cyclic opening and closing of the valve, and to actuate said means to vary the ratio of the period of time for which the valve is open to the period of time for which the valve is closed in accordance with the extent of departure of the sensed temperature from the selected value of said temperature.

References Cited in the file of this patent

UNITED STATES PATENTS

| | | |
|---|---|---|
| 1,535,240 | Morris | Apr. 28, 1925 |
| 2,109,222 | Ryder | Feb. 22, 1938 |
| 2,336,232 | Doran | Dec. 7, 1943 |
| 2,440,566 | Armstrong | Apr. 27, 1948 |
| 2,474,033 | Chamberlin et al. | June 21, 1949 |
| 2,496,366 | Adelson | Feb. 7, 1950 |
| 2,506,694 | Watson | May 9, 1950 |
| 2,517,313 | Hooker et al. | Aug. 1, 1950 |
| 2,519,624 | Balantyne et al. | Aug. 22, 1950 |
| 2,538,642 | Gardiner | Jan. 16, 1951 |
| 2,564,127 | Orr | Aug. 14, 1951 |
| 2,573,368 | Seborg | Oct. 30, 1951 |
| 2,681,116 | Treseder | June 15, 1954 |

FOREIGN PATENTS

| | | |
|---|---|---|
| 625,335 | Great Britain | June 27, 1949 |
| 626,045 | Great Britain | July 8, 1949 |